UNITED STATES PATENT OFFICE.

IWAN OSTROMISLENSKY, OF MOSCOW, RUSSIA.

PROCESS OF MANUFACTURING ERYTHRENE HYDROCARBONS.

1,108,781.   Specification of Letters Patent.   Patented Aug. 25, 1914.

No Drawing.   Application filed April 16, 1912. Serial No. 691,161.

*To all whom it may concern:*

Be it known that I, IWAN OSTROMISLENSKY, doctor of philosophy, a subject of the Emperor of Russia, and a resident of Moscow, Russia, have invented Processes of Manufacturing Erythrene Hydrocarbons, of which the following is a specification.

The products of decomposition of vapors of turpentine oil at a high temperature were first examined by Schulz in 1877 (*Berichte der Deutschen Chemischen Gesellschaft*, Volume X, page 113, year 1877). It was however only in 1882 that Tilden succeeded in proving that when passing vapors of turpentine oil through an incandescent iron tube, isoprene is produced (*Chemical News*, 129, of 1882, *Journal of the American Chemical Society* 45, 910 of 1884. *Jahresbericht über die Fortschritte der Chemie und Verwandter Teile Anderer Wissenschaften* 1882, 906. Compare Mokiewsky, *Centralblatt der Chemie* 1899 I, 589. *Journal of the Russian Physico-Chemical Society* 30, 1889). Harries and Gottlob introduced some improvements in the process, (*Liebig's Annalen der Chemie*, volume 383, page 190 year 1911). Other improvements were introduced by Staudinger (*Berichte der Deutschen Chemischen Gesellschaft* year 1911, pages 2212, 2215) and by Silberrad. The authors in question obtained their products from limonenes or dipentenes. Staudinger decomposed the vapors of the substances in question in a vacuum of 2 mm. or in a current of a neutral gas.

The process of Tilden as carried out by Staudinger, is accompanied by considerable losses of isoprene. Isoprene under the circumstances is a gas difficult to condense. The considerable unavoidable expenses for cooling the products of reaction, preclude the possibility of an industrial application of the process. It is further not very well possible in practice to work with apparatus which have a pressure only of 2—3 mm. Substitution for the vacuum of a current of neutral gas according to Staudinger, is also not possible in practice. It would be necessary to use a considerable quantity of a neutral gas which is free from oxygen, for instance nitrogen. This would however considerably increase the expense. On the other hand, the use of a gas current would bring about a large loss of isoprene. In order to retain the isoprene carried away, it would be necessary to use absorption substances such as bromin. Thus, the expense would be again considerably increased.

According to Staudinger, the yield of isoprene with the use of a vacuum or of a neutral gas current, from dipentenes or limonenes is increased by heating the vapors of limonene or dipentene in a diluted state, to high temperatures. In that way the decomposition and isomerization of isoprene, which bring about losses when there is a strong concentration, are avoided.

According to experiments which led to the present process, when limonene is boiled for a long time in a reflux cooler (boiling temperature about 178° C.,) not only heavy oils are formed, but also solid hydrocarbons, probably polyterpenes. According to the process, according to this invention, these reactions are avoided by heating the limonene, dipentene or turpentine oil, not to the boiling point, but reducing the boiling point by adding liquids of a lower boiling point. The solvent added for dipentene and limonene or turpentine oil can be solid or liquid at the ordinary temperature. It must be easily condensed and must not act on the isoprene in the conditions of the reaction. The solvent used must moreover not be perceptibly decomposed at a higher temperature.

Benzene can be used as a solvent or its homologues and polycyclic compounds such as naphthalene and the like. The solvent is heated to boiling, and vapors of the dissolved substance and of the solvent, are exposed to the action of a higher temperature, such as for instance of an incandescent metal wire or of an incandescent wire netting. 80–90% of the theoretical quantity of isoprene can be obtained.

When using a solvent which is solid at ordinary temperatures, it is advisable, for the purpose of avoiding choking the apparatus, to remove the products of reaction in a continuous manner, and to provide the apparatus with safety valves and pressure gages.

Instead of making a solution of limonene or dipentene, the vapors can be brought together separately. When the vapors are used separately, limonene or dipentene can be added to the vapor of the solvent, such as benzol, in front of the incandescent metal, and the relative quantity of the same could be regulated either by means of a drip funnel or by means of any other suitable apparatus. The process could be also carried out by introducing limonene or dipentene into a current of easily condensing substances which are solid or liquid at the ordinary temperature. The temperature selected must be below the boiling point of the substances. The mixture of the gases then comes into an incandescent metal tube, or strikes metal wires or wire netting. When benzene is used as a means for diluting, vapors of limonene or dipentene can be easily obtained between 95 and 115° C.

The homologues of dipentene behave in a similar manner at a higher temperature. The hydrocarbon is decomposed under the same conditions, forming divinyl. This hydrocarbon—which is a homologue of the dipentene—is obtained on heating divinyl to 80–100° C. This observation has great technical value, as polymerization of divinyl into the simplest rubber takes place with formation of this hydrocarbon as by-product. It is easy to reconvert the same into divinyl from which a new quantity of rubber is then obtained.

Example: A mixture of 100 parts by volume of limonene (about 88 parts by weight) and 50 parts by volume of benzene (about 44 parts by weight) are heated in a reflux cooler (the temperature of the cooler about 50°). In the portion of the apparatus situated between the supply for the mixture and the cooler, a platinum wire one meter long is heated to dark red by an electric current. The cooler is provided with a dephlegmator as well as a thermometer and connected to another cooler followed by a receiver.

The following results have been obtained:

| Duration of the process. | Temperature of boiling mixture. | Temperature of the chamber with wire. | Temperature in the dephlegmator. | Isoprene obtained per minute. |
|---|---|---|---|---|
| Hours. | | | | |
| 2.30 | 102 | 170 | 20 | 0 |
| 2.55 | 133 | 174 | 20 | 0 |
| 3. | 108 | 176 | 46 | 10 |
| 3.05 | 121 | 171 | 33 | 7 |
| 3.10 | 108 | 178 | 35 | 9 |
| 3.30 | 103 | 169 | 31.5 | 8 |
| 3.40 | 115 | 178 | 28.5 | 0 |

In the last experiments no isoprene at all was produced. This was due to the fact that no benzol remained in the tube of the reflux cooler. During the experiments mentioned below, the reaction tube was surrounded with asbestos.

| Duration of the process. | Temperature of boiling mixture. | Temperature of the chamber with wire. | Temperature in the dephlegmator. | Isoprene obtained per minute. |
|---|---|---|---|---|
| Hours. | | | | |
| 4.08 | 98 | 208 | 33.5 | 1-3 |
| 4.15 | 98 | 170 | 33 | 1-3 |
| 4.42 | 103 | 195 | 40 | 10 |
| 4.50 | 104 | 190 | 40 | 22 |
| 4.55 | 103 | 193 | 36 | 20 |
| 5.10 | 112 | 190 | 37 | 10 |
| 5.22 | 115 | 194 | 47 | 16 |
| 5.26 | 117 | 199 | 42 | 14 |

The above table shows that the speed of reaction as well as the yield of isoprene, are considerably increased when reducing the boiling point of the original mixture: at a temperature of 104°, 22 drops of isoprene are formed per minute, while at 115° only 16 drops, and at 117° only 14 drops. This conclusion is sometimes rendered unclear by the action of other factors.

What I claim is

A process of manufacturing an erythrene hydrocarbon from isomeric terpenes boiling at about 175° C, which consists in converting the raw material into a vapor at a temperature lower than the normal boiling temperature of the said raw material, by adding thereto some easily condensed and sufficiently permanent compound which is not a gas, at the normal temperature and heating the mixture, and then exposing the vaporous mixture thus obtained to a high temperature.

In testimony whereof, I have signed my name to this specification in the presence of two subscribing witnesses:

IWAN OSTROMISLENSKY.

Witnesses:
W. SOHNDNOT,
CHR. ERFURT.